United States Patent Office 3,158,628
Patented Nov. 24, 1964

3,158,628
21-CARBETHOXYLATES OF PREDNISONE AND PREDNISOLONE
John A. Hogg, Kalamazoo Township, Kalamazoo County, and Jerome Korman, Portage Township, Kalamazoo County, Mich., assignors to The Upjohn Company, Kalamazoo, Mich., a corporation of Michigan
No Drawing. Filed May 10, 1956, Ser. No. 583,926
3 Claims. (Cl. 260—397.45)

This invention is concerned with physiologically active steroid hormones and is more particularly concerned with the 21-carbethoxylates of 11β,17α,21-trihydroxy-1,4- pregnadiene-3,20-dione and 17α,21-dihydroxy-1,4-pregnadiene-3,11,20-trione, i.e. prednisolone 21-carbethoxylate and prednisone 21-carbethoxylates represented by the following formula:

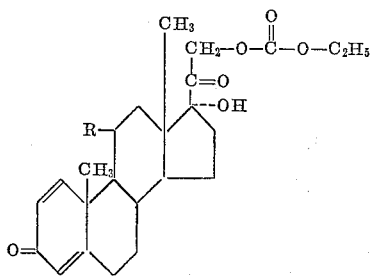

wherein R is selected from the group consisting of β-hydroxy and oxo.

This application is a continuation-in-part of our copending applications Serial Nos. 485,316 and 485,317, both filed January 31, 1955, as continuations-in-part of our copending application Serial No. 406,364, filed January 26, 1954, now U.S. Patent No. 2,774,775.

It is an object of the present invention to provide the 21-carbethoxylates of prednisolone and prednisone which are physiologically active agents of high potency having high and prolonged anti-arthritic activity, orally and subcutaneously, anti-inflammatory activity, particularly locally and intra-articularly, little or no salt retention activity, and a superior therapeutic ratio. The compounds of the present invention are substitutable for other adrenal cortical steroid hormones in known adrenal cortical steroid hormone-containing pharmaceutical compositions such as tablets, lotions, ointments, injectables, and elixirs. Other objects and uses of the present invention will be apparent to one skilled in the art.

The 21-carbethoxylate esters of prednisolone and prednisone of the present invention are obtained by esterification of prednisolone and prednisone, respectively, to introduce the 21-carbethoxylate radical, as more fully described in the following illustrative examples.

Example 1

Fifty milliliters of ethyl chlorocarbonate is added to a cold (zero to five degrees centigrade), stirred solution of forty grams of prednisolone in 300 milliliters of pyridine. After standing overnight in the refrigerator, the reaction mixture is diluted, slowly with stirring, with 500 milliliters of ice water. The crystalline product is removed by filtration, washed well with water, and dried. Purified prednisolone 21-carbethoxylate is obtained by recrystallization from ethyl acetate.

Example 2

Substituting forty grams of prednisone for the prednisolone in the foregoing procedure provides prednisone 21-carbethoxylate.

We claim:
1. A compound of the formula

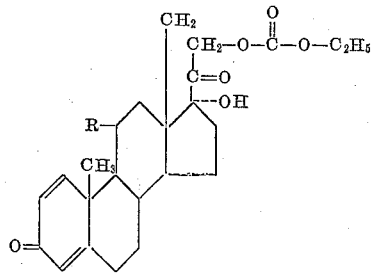

wherein R is a member selected from the group consisting of β-hydroxy and oxo.

2. 11β,17α,21-trihydroxy - 1,4 - pregnadiene-3,20-dione 21-carbethoxylate.

3. 17α,21 - dihydroxy - 1,4 - pregnadiene-3,11,20-trione 21-carbethoxylate.

References Cited in the file of this patent
UNITED STATES PATENTS

| | | |
|---|---|---|
| 2,183,589 | Reichstein | Dec. 19, 1939 |
| 2,736,734 | Sarett | Feb. 28, 1956 |
| 2,768,189 | Nominee | Oct. 23, 1956 |